US012693868B2

(12) United States Patent
Hyun et al.

(10) Patent No.: US 12,693,868 B2
(45) **Date of Patent: \*Jul. 28, 2026**

(54) METHOD OF REPROGRAMMING A BOOT AREA

(71) Applicant: HYUNDAI AUTOEVER CORP., Seoul (KR)

(72) Inventors: Sung Hwan Hyun, Seoul (KR); Kyo Min Kim, Seoul (KR); In Jung Won, Seoul (KR); Sang Do An, Seoul (KR)

(73) Assignee: HYUNDAI AUTOEVER CORP., Seoul (KR)

( \* ) Notice: Subject to any disclaimer, the term of this patent is extended or adjusted under 35 U.S.C. 154(b) by 120 days.

This patent is subject to a terminal disclaimer.

(21) Appl. No.: 18/543,757

(22) Filed: Dec. 18, 2023

(65) Prior Publication Data

US 2024/0211270 A1      Jun. 27, 2024

(30) Foreign Application Priority Data

Dec. 26, 2022    (KR) ......................... 10-2022-0184415

(51) Int. Cl.
*G06F 9/4401*      (2018.01)
*G06F 8/65*      (2018.01)
(52) U.S. Cl.
CPC .............. *G06F 9/4401* (2013.01); *G06F 8/66* (2013.01)
(58) Field of Classification Search
None
See application file for complete search history.

(56) References Cited

U.S. PATENT DOCUMENTS

| | | | | |
|---|---|---|---|---|
| 5,432,927 | A * | 7/1995 | Grote ..................... | G11C 29/74 714/6.32 |
| 11,222,121 | B2 | 1/2022 | Robinson et al. | |
| 12,013,947 | B2 | 6/2024 | Robinson et al. | |
| 2004/0078119 | A1* | 4/2004 | Luitje ....................... | G06F 8/60 701/1 |
| 2006/0010393 | A1 | 1/2006 | Jung et al. | |
| 2017/0242678 | A1* | 8/2017 | Sangameswaran ..... | G06F 8/656 |
| 2019/0012483 | A1* | 1/2019 | Thompson .............. | G06F 21/78 |

(Continued)

FOREIGN PATENT DOCUMENTS

| | | |
|---|---|---|
| KR | 20060003766 A | 1/2006 |
| KR | 100631584 B1 | 10/2006 |

(Continued)

OTHER PUBLICATIONS

Bagwan, Automotive Bootloader (FBL), Aug. 8, 2022 (Year: 2022).*

(Continued)

*Primary Examiner* — Kim Huynh
(74) *Attorney, Agent, or Firm* — Lempia Summerfield Katz LLC

(57) ABSTRACT

A method performed by an electronic control unit (ECU) includes: manipulating a boot area of an ECU so that the boot area is in an abnormal state; entering a boot strap loader (BSL) area of the ECU in response to detecting that the boot area is in an abnormal state upon resetting the ECU; determining whether to perform reprogramming of the boot area based on ROM identification information stored in the BSL area; and reprogramming the boot area when it is determined to perform the reprogramming.

14 Claims, 6 Drawing Sheets

(56) References Cited

U.S. PATENT DOCUMENTS

| | | | |
|---|---|---|---|
| 2020/0320201 | A1 | 10/2020 | Robinson et al. |
| 2021/0097184 | A1 | 4/2021 | Rao et al. |
| 2022/0237299 | A1 | 7/2022 | Robinson et al. |

FOREIGN PATENT DOCUMENTS

| | | | |
|---|---|---|---|
| KR | 20080018647 | A | 2/2008 |
| KR | 20130079775 | A | 7/2013 |
| KR | 20200117889 | A | 10/2020 |
| KR | 20220070462 | A | 5/2022 |

OTHER PUBLICATIONS

Understanding What is a Flash Bootloader and the Nuances of an Automotive ECU Re-programming , May 27, 2019 (Year: 2019).*
Tadqeem, A Begginers Guide to Automotive Bootloaders—Understanding the basics, Apr. 22, 2022 (Year: 2022).*
Office Action cited in Korean application No. 10-2022-0184415; May 27, 2025; 14 pp.
Office Action cited in the corresponding Korean patent application No. 10-2022-0184415; Dec. 2, 2025; 10 pp.

* cited by examiner

—Prior Art—

10

20

<u>30</u>

40

50

| Vehicle |
|---|
| ECU |
| Boot Software Version |

| Vehicle |
|---|
| ECU |
| BSL Software Version |

FIG. 5

METHOD OF REPROGRAMMING A BOOT AREA

CROSS-REFERENCE TO RELATED APPLICATION

This application claims the benefit of and priority to Korean Patent Application No. 10-2022-0184415, filed on Dec. 26, 2022, the entire contents of which are incorporated herein by reference.

BACKGROUND

1. Field

This disclosure relates to a boot area reprogramming method and an electronic control unit to which the method is applied.

2. Description of the Related Art

In general, many electronic control units (ECUs), including engine controllers, are applied to vehicles to control the operation of the vehicle. An ECU for vehicles can be programmed (updated) for the purpose of improving performance, developing technology, and correcting defects.

FIG. 1 is a diagram illustrating a reprogramming method of an ECU.

Referring to FIG. 1, the vehicle software mounted on the ECU is embedded in a read-only memory (ROM) 10, and the ROM 10, in which the vehicle software is embedded, is divided into a Boot Strap Loader (BSL) area for reprogramming the boot area, a boot area for reprogramming Normal area, and NORMAL area where application code is executed.

The BSL area contains the code necessary to reprogram the boot area, and when the ECU is turned on, it enters the BSL area.

The boot area contains the code necessary for reprogramming the NORMAL area, and after the normal state of the boot area is confirmed in the BSL area, the boot area is entered.

The NORMAL area contains codes necessary for control execution in an actual ECU, and after the normal state of the NORMAL area is confirmed in the boot area, the NORMAL area is entered.

Each area except the BSL area can be reprogrammed for the purpose of improving performance, developing technology, and correcting defects, and is implemented so that aupper area software can be changed in a lower area. For example, reprogramming of the boot area can be performed in the BSL area, which is a lower area, and reprogramming of the NORMAL area can be performed in the boot area, which is a lower area.

Referring again to FIG. 1, a method of reprogramming the ROM of an ECU using the reprogram ROM of a diagnostic device is shown (20).

When reprogramming an ECU, it is checked whether the information of the ROM mounted on the ECU matches the information of the reprogram ROM of the diagnostic device reprogrammed, if they match, the reprogramming may be performed. Here, the reprogram ROM of the diagnostic device may be, for example, a HEX format file.

Problems may occur during the reprogramming process of the boot area of the vehicle's ECU. For example, if entry into the BSL area where boot reprogramming is performed fails, entry into the lower level of the boot area is impossible.

As a result, a problem may occur in which reprogramming of the boot area becomes impossible.

As described above, in situations where it is impossible to enter the lower level of the boot area, a technology that can perform reprogramming of the boot area is required.

SUMMARY

Aspects of the present disclosure provide a boot reprogramming method in cases where entry into the BSL area of the ECU is impossible.

Aspects of the present disclosure provide a method for forcibly entering the BSL area of an ECU.

Aspects of the present disclosure provide a software-based method of improving problems that occur during a boot area reprogramming process of an ECU.

However, aspects of the present disclosure are not restricted to those set forth herein. The above and other aspects of the present disclosure should become more apparent to one of ordinary skill in the art to which the present disclosure pertains by referencing the detailed description of the present disclosure given below.

According to an aspect of the present disclosure, a method performed by an electronic control unit (ECU) may comprise: manipulating a boot area of an ECU so that the boot area is in an abnormal state; entering a boot strap loader (BSL) area of the ECU in response to detecting that the boot area is in an abnormal state upon resetting the ECU; determining whether to perform reprogramming of the boot area based on ROM identification information stored in the BSL area; and reprogramming, when it is determined to perform the reprogramming, the boot area.

In some embodiments, the manipulating the boot area comprises: checking whether ROM identification information stored in the boot area matches ROM identification information stored in a diagnostic device; checking, when it is confirmed that the ROM identification information stored in the boot area and the ROM identification information stored in the diagnostic device do not match, whether the ROM identification information stored in the BSL area and the ROM identification information stored in the diagnostic device do not match; checking, when the ROM identification information stored in the BSL area and the ROM identification information stored in the diagnostic device do not match, information necessary for reprogramming the boot area; and deleting, when information necessary for the reprogramming is identified, the boot area.

In some embodiments, the information necessary for the reprogramming includes vehicle model and controller information.

In some embodiments, the entering the BSL area comprises performing reset of the ECU and entering, if the boot area is not in a normal state when booting the ECU, the BSL area.

In some embodiments, the ROM identification information stored in the BSL area includes vehicle model, controller, and software version.

In some embodiments, the entering the BSL area comprises entering, if the boot area is not in a normal state when booting the ECU, the BSL area.

In some embodiments, the method may further comprise before manipulating the boot area, running the ECU in the boot area.

According to another aspect of the present disclosure, an electronic control unit (ECU) comprises one or more processors, a memory for loading a boot program executed by the processor and a storage for storing the boot program. In particular, the boot program includes instructions for: performing operations comprising; manipulating a boot area of an ECU so that the boot area is in an abnormal state; entering a boot strap loader (BSL) area of the ECU in response to detecting that the boot area is in an abnormal state upon resetting the ECU, determining whether to perform reprogramming of the boot area based on ROM identification information stored in the BSL area; and reprogramming, when it is determined to perform the reprogramming, the boot area.

In some embodiments, the manipulating the boot area of the ECU so that the boot area is in an abnormal state comprises: checking whether ROM identification information stored in the boot area matches ROM identification information stored in a diagnostic device; checking, when it is confirmed that the ROM identification information stored in the boot area and the ROM identification information stored in the diagnostic device do not match, whether the ROM identification information stored in the BSL area and the ROM identification information stored in the diagnostic device do not match; checking, when the ROM identification information stored in the BSL area and the ROM identification information stored in the diagnostic device do not match, information necessary for reprogramming the boot area and deleting, when information necessary for the reprogramming is identified, the boot area.

In some embodiments, the information necessary for the reprogramming includes vehicle model and controller information.

In some embodiments, the entering the BSL area comprises, performing reset of the ECU and entering, if the boot area is not in a normal state when booting the ECU, the BSL area.

In some embodiments, the ROM identification information stored in the BSL area includes vehicle model, controller, and software version.

In some embodiments, entering the BSL area comprises entering, if the boot area is not in a normal state when booting the ECU, the BSL area.

In some embodiments, the operations performed by the boot program may further comprise before manipulating the boot area, running the ECU in the boot area.

BRIEF DESCRIPTION OF THE DRAWINGS

These and/or other aspects should become apparent and more readily appreciated from the following description of the embodiments, taken in conjunction with the accompanying drawings in which:

FIG. 5 is a diagram illustrating in more detail the ROM identification information described with reference to FIGS. 3 and 4.

DETAILED DESCRIPTION

Figure 1:
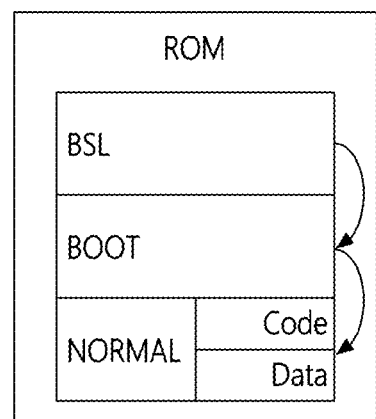
FIG. 1 is a diagram illustrating a reprogramming method of an ECU.
Figure 1:
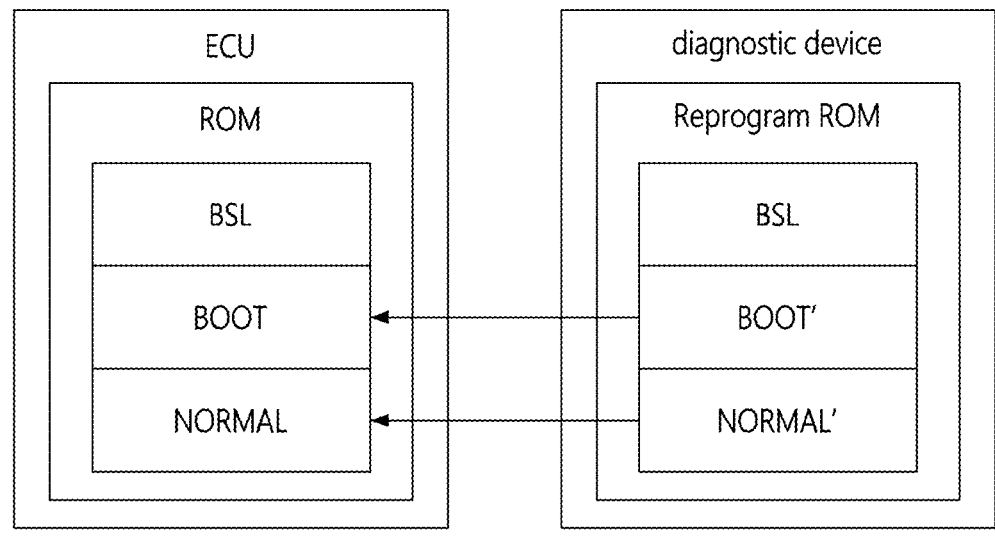

Hereinafter, embodiments of the present disclosure are described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure is thorough and complete and fully conveys the concept of the disclosure to those of ordinary skill in the art, and the present disclosure is only defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof is omitted.

Unless otherwise defined, all terms used in the present specification (including technical and scientific terms) may be used in a sense that can be commonly understood by those of ordinary skill in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase. When a component, device, element, or the like of the present disclosure is described as having a purpose or performing an operation, function, or the like, the component, device, or element should be considered herein as being "configured to" meet that purpose or to perform that operation or function.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure are described with reference to the attached drawings.

Figure 2:
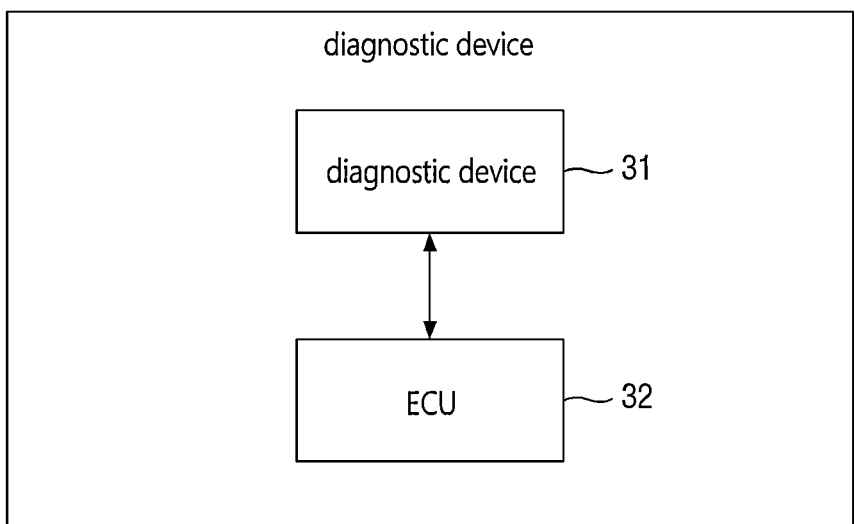
FIG. 2 is a configuration diagram of an embedded system for reprogramming an ECU according to an embodiment of the present disclosure.

FIG. 2 is a configuration diagram of an embedded system for reprogramming an ECU according to an embodiment of the present disclosure.

As shown in FIG. 2, the embedded system 30 may include a diagnostic device 31 that communicates with a server (not shown) and an electronic control unit (ECU) 32, and the ECU 32 that communicates with the diagnostic device 31. Here, the ECU 32 included in the embedded system 30 is not limited to this, and the embedded system 30 may include a plurality of ECUs.

According to one embodiment, the embedded system 30 of the present disclosure may be a mobile embedded system. For example, the embedded system 30 may be an embedded system for a vehicle.

The diagnostic device 31 can perform reprogramming of the ECU 32. Here, the ECU 32 and the diagnostic device 31 can be connected and communicate through a network. For example, the diagnostic device 31 and the ECU 32 are connected with a CAN bus and can transmit and receive data through CAN communication. The network method between the diagnostic device 31 and the ECU 32 of the present disclosure is not limited to this, and communication may be performed according to a CAN-FD, LIN, or Ethernet communication protocol.

The diagnostic device 31 may store information about the ECU 32 connected to the network. The diagnostic device 31 can determine the state of the ECU 32, determine the ECU that needs reprogramming, and perform reprogramming.

According to one embodiment, the diagnostic device 31 may determines the running area of the ECU 32, determine whether the upper area of the running area is in a normal state, and, if the upper area is in a normal state, and perform reprogramming of the upper area.

According to one embodiment, when it is impossible to enter the upper area of the area in which the ECU 32 is running, the diagnostic device 31 may forcibly manipulate the state of the upper area into an abnormal state and then forcibly induce entry of the upper area.

For example, when the ECU 32 is running in the boot area, when the boot ROM identification information of the ECU 32 does not match the reprogram ROM identification information of the diagnostic device 31 (i.e., in cases where reprogramming of the ECU 32 is required and in a situation where the ECU 32 cannot receive the BSL area entry CAN message due to problems in the network environment at the time of booting), the diagnostic device 31 may force to enter into the BSL area according to the abnormal state of the boot area by deleting the boot area so that the boot area is in an abnormal state at the time of booting of the ECU 32. Accordingly, boot reprogramming can be performed by checking whether the ROM identification information in the BSL area matches the reprogram ROM identification information of the diagnostic device 31. The method of manipulating the boot area into an abnormal state to force entry into the BSL area is described below.

According to one embodiment, reprogramming of the ECU 32 may be performed with the diagnostic device 31 as the main subject as described above, but the present disclosure is not necessarily limited thereto, and the ECU 32 can be the main subject and carry out it.

For example, in the case of an ECU included in a vehicle's embedded system, the ECU 32 may receive an electronic signal and determine the peculiarities of the current vehicle's embedded system to determine whether there is a problem. This can refer to a device that performs mechanical control of a vehicle's engine and transmission.

According to one embodiment, while running the boot area, the ECU 32 may enter the BSL area and perform reprogramming of the boot area.

Here, a case where the ECU 32 enters the BSL area may be 1) the case where a BSL entry CAN message is received at the time of booting of the ECU 32; 2) the case where the boot ROM identification information in the boot reprogram sequence of the ECU 32 in normal operation matches the reprogram ROM identification information of the diagnostic device 31; and 3) the case where the boot area is not in a normal state at the time of booting the ECU 32.

According to one embodiment, if the ECU 32 cannot enter the BSL area because none of the cases 1) to 3) apply, the ECU 32 may forcibly enter the BSL area, and the same method as the method described in relation to the diagnostic device 31 can be applied, and the method is described in detail again below.

It should be noted that each component of the embedded system shown in FIG. 2 represents functionally distinct functional elements, and that multiple components may be implemented in an integrated form in an actual physical environment. For example, at least some of the diagnostic device 31 and the ECU 32 may be implemented in the form of different logic within one physical computing device.

Additionally, in an actual physical environment, each of the above components may be implemented as separated into a plurality of detailed functional elements. For example, a first function of ECU 32 may be implemented in a first computing device and a second function may be implemented in a second computing device.

So far, an embedded system and network environment for reprogramming an ECU according to an embodiment of the present disclosure have been described with reference to FIG. 2. Hereinafter, a method for reprogramming a boot area of an ECU according to various embodiments of the present disclosure is described in detail. In order to provide convenience of understanding, the description of the method is continued assuming the environment shown in FIG. 2, but those of ordinary skill in the art should clearly understand that the environment in which difference updates are provided can be modified.

Each step of the methods described below may be performed by a computing device. In other words, each step of the above methods may be implemented as one or more instructions executed by a processor of a computing device. All steps included in the methods may be performed by a single physical computing device, but the first steps of the method may be performed by a first computing device and the second steps of the method may be performed by a second computing device. In other words, each step of the method can be performed by a computing system. Hereinafter, unless otherwise specified, the description is continued assuming that each step of the above method is performed by the diagnostic device 31 or the ECU 32. However, for convenience of explanation, the description of the operator of each step included in the method may be omitted. In addition, in the methods described below, the execution order of each operation can be changed within the range where the execution order can be logically changed as needed.

Figure 3:
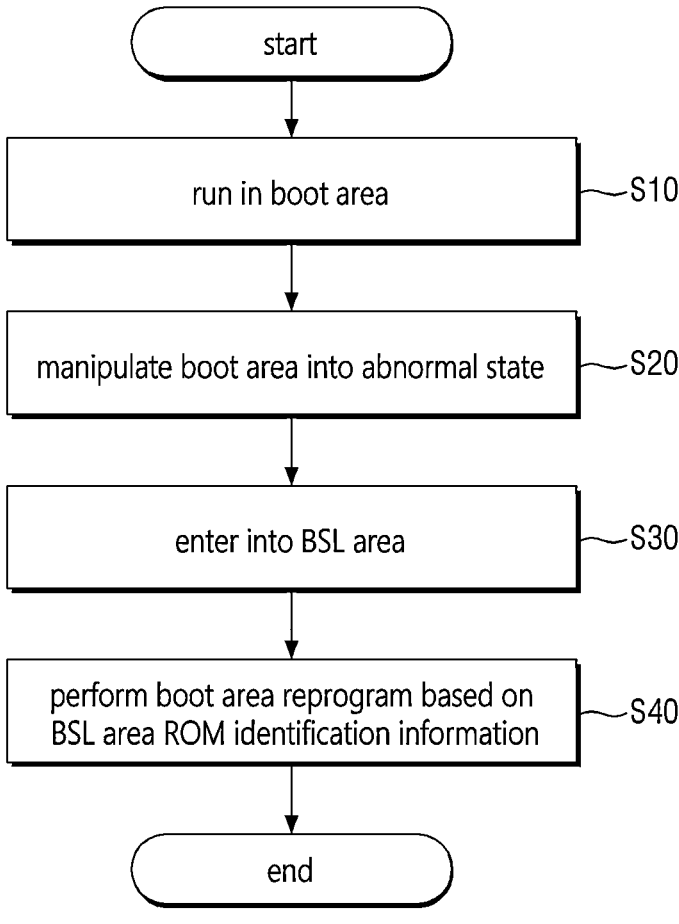
FIG. 3 is a flowchart illustrating a boot area reprogramming method according to another embodiment of the present disclosure.

FIG. 3 is a flowchart illustrating a boot area reprogramming method according to another embodiment of the present disclosure.

In step S10, software may be running in the boot area of the ROM. Reprogramming of the boot area of the ROM may be necessary.

According to one embodiment, there may be a situation where it is impossible to enter the BSL area, which is a lower area of the boot area where boot reprogramming is performed.

In step S20, in a situation where entry into the BSL area is impossible as described above, a manipulation may be performed to bring the boot area into an abnormal state in order to enter the BSL area.

According to one embodiment, the boot area may be deleted to render the boot area in an abnormal state. The method for rendering the boot area into an abnormal state of the present disclosure is not limited to this, and various known methods for manipulating the boot area into an abnormal state can be used.

According to one embodiment, manipulating the boot area into an abnormal state can be performed in the software itself, or can be performed through a controller in an external device such as a diagnostic device.

In step S30, if the software is reset after the boot area enters an abnormal state, the abnormal state of the boot area is confirmed at the booting time and entry into the BSL area of the software ROM can be performed.

In step S40, reprogramming of the boot area, which is an upper area, may be performed based on the ROM identification information of the BSL area.

According to one embodiment, it is checked whether the ROM identification information of the BSL area matches the ROM identification information reprogrammed, and if they match, reprogramming of the boot area can be performed.

The above-described embodiments can be applied not only when software is running in the boot area, but also when software is running in the NORMAL area. For example, when software is running in the NORMAL area, and the NORMAL area is forcibly manipulated into an abnormal state and the software is reset, reprogramming of the NORMAL area may be performed in the boot area.

According to the above-described embodiments, when software is running in the upper area and it is impossible to enter into the lower area for reprogramming of the upper area, and when the upper area is manipulated into an abnormal state, such as deleting the upper area, and then the software is reset, the conditions for entering the lower area are satisfied, and reprogramming of the upper area can be performed after entering the lower area.

Figure 4:
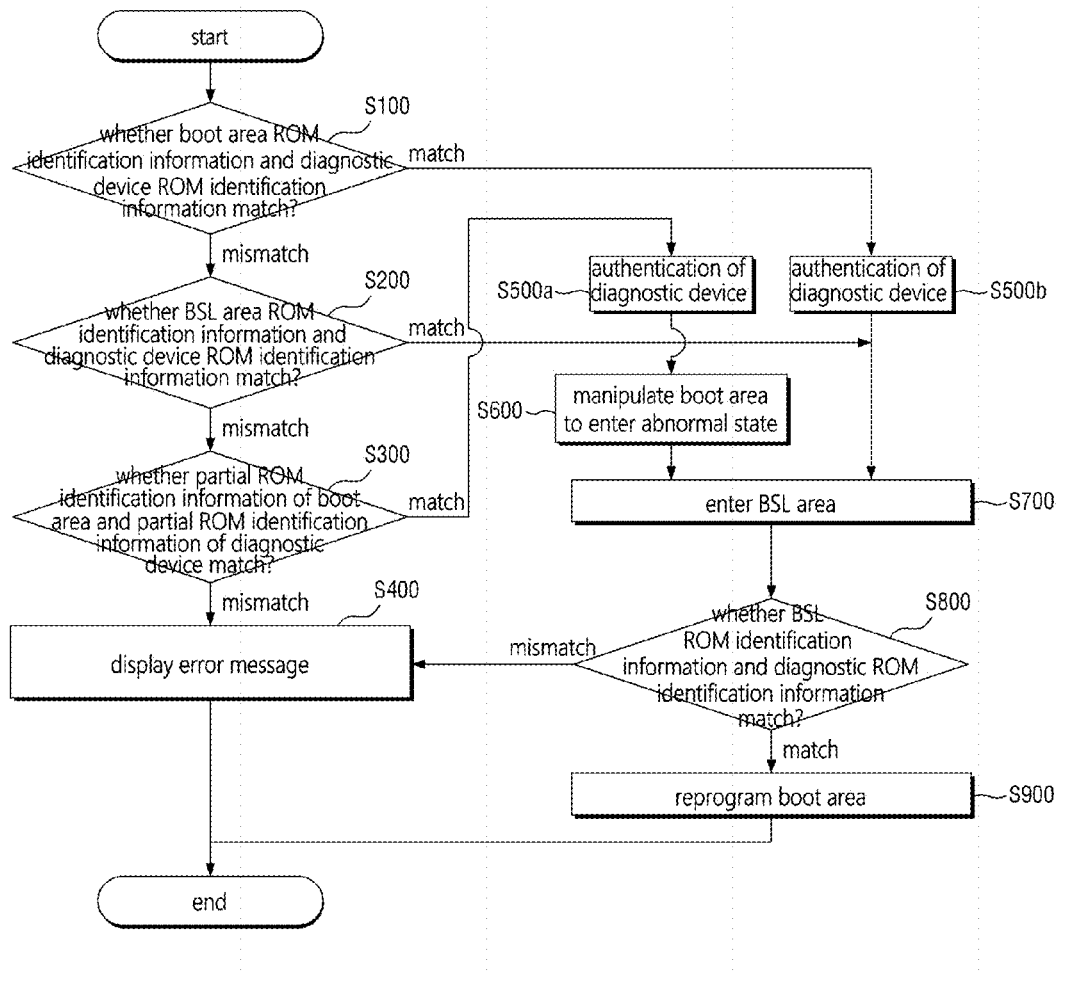
FIG. 4 is a flowchart illustrating a method for reprogramming a boot area of an ECU according to another embodiment of the present disclosure.

FIG. 4 is a flowchart illustrating a method for reprogramming a boot area of an ECU according to another embodiment of the present disclosure. Here, it is assumed that the ECU is running in the boot area.

In step S100, it may be determined whether the boot area ROM identification information and the reprogram ROM identification information of the diagnostic device 31 match. Here, the determination of whether the ROM identification information matches is made by checking whether the ROM identification information of the ECU 32 and the diagnostic device 31 matches to prevent reprogramming to other vehicle models, other controllers, and other software versions. If they do not match, reprogramming is not performed.

Here, ROM identification information of the boot area is described with reference to FIG. 5.

Referring to FIG. 5, ROM identification information 40 of the boot area is shown. Here, the ROM identification information of the boot area may include vehicle model information, electronic control unit (ECU) information, and boot area software version information.

According to one embodiment, the ROM identification information in the boot area may include various information for identifying the ROM of the ECU 32 in addition to the above information.

This is described again with reference to FIG. 4.

According to one embodiment, the ROM identification information in the boot area may be verified using a ROM identification information verification diagnostic code from the ECU 32. For example, when the ECU 32 is running in the boot area or the NORMAL area, boot ROM identification information can be identified.

In step S500b, in response to a determination that the ROM identification information of the boot area of the ECU 32 and the reprogram ROM identification information of the diagnostic device 31 match, authentication of the diagnostic device 31 may be performed.

According to one embodiment, authentication of the diagnostic device 31 may be performed using a known seed key check method. For example, when the diagnostic device 31 requests reprogramming to the ECU 32, and the ECU 32 generates a seed value, stores it, and transmits it to the diagnostic device 31, the diagnostic device 31 may generates a key value using the received seed value and key generation function and transmit it to the ECU 32, and the ECU 31 may generate a key value using the previously stored seed value and key generation function, and perform authentication by comparing the generated key value with the key value received from the diagnostic device to determine whether they match.

When authentication of the diagnostic device 31 is completed, entry into the BSL area of the ROM of the ECU 32 is performed (S700), and it is determined whether the BSL ROM identification information matches the ROM identification information of the diagnostic device 31 (S800), if they match, reprogramming of the boot area may be performed (S900).

In step S200, in response to determining that the ROM identification information in the boot area of the ECU 32 and the reprogram ROM identification information of the diagnostic device 31 do not match, it may be determined whether the ROM identification information in the BSL area of the ECU 32 and the ROM identification information of the diagnostic device 31 match.

Here, the ROM identification information in the BSL area is described with reference to FIG. 5.

Referring to FIG. 5, ROM identification information 50 in the BSL area is shown. Here, the ROM identification information in the BSL area may include vehicle model information, electronic control unit (ECU) information, and BSL area software version (BSL Software Version) information.

According to one embodiment, the ROM identification information in the BSL area may include various information for identifying the ROM of the ECU 32 in addition to the above information.

This is described again with reference to FIG. 4.

The case where the ROM identification information of the boot area of the ECU 32 and the reprogram ROM identification information of the diagnostic device 31 do not match, for example, may be the case where the boot software version changes among the reprogram ROM identification information of the diagnostic device 31 due to a change in the boot function, making boot reprogramming impossible due to mismatch in identification information.

A function of maintaining the execution area of the ECU 32 as the BSL area can be implemented to enable reprogramming. For example, when the ECU 32 boots, the ECU 32 receives a CAN message containing a specific password, so that the ECU 32 stays in the BSL area and boot reprogramming can be performed. However, if the CAN message is not received due to problems such as the network environment, boot reprogramming may not be performed. The method of the present disclosure for enabling boot reprogramming is described below in step S600.

In step S700, in response to a determination that the ROM identification information in the BSL area of the ECU 32 and the ROM identification information of the diagnostic device 31 match, entry into the BSL area may be performed (S700).

After entry into the BSL area is performed (S700), it is determined whether the BSL ROM identification information and the ROM identification information of the diagnostic device 31 match (S800), and if they match, reprogramming of the boot area can be performed (S900).

In step S300, in response to determining that the ROM identification information of the BSL area of the ECU 32 and the ROM identification information of the diagnostic device 31 do not match, it may be determined whether partial ROM identification information of the boot area of the ECU 32 and partial ROM identification information of the diagnostic device 31 match.

Here, the partial ROM identification information may be the minimum ROM information required for reprogramming. For example, the partial ROM identification information may be vehicle model information and ECU information.

In step S400, if the partial ROM identification information in the boot area of the ECU 32 and the partial ROM identification information of the diagnostic device 31 do not match, an error message may be displayed.

In step S500a, in response to a determination that the ROM identification information in the boot area of the ECU 32 and the reprogram ROM identification information of the diagnostic device 31 match, authentication of the diagnostic device 31 may be performed. Here, the authentication method in step S500b may be applied as the authentication method of the diagnostic device 31.

In step S600, the boot area of the ECU 32 may be manipulated to enter an abnormal state.

According to one embodiment, manipulating the boot area into an abnormal state may mean, for example, manipulating the boot area deleted.

In step S700, when the ECU 32 is reset, the boot area is in an abnormal state at the time of booting the ECU 32, so entry into the BSL area can be performed.

In step S800, it is determined whether the BSL ROM identification information matches the ROM identification information of the diagnostic device 31, and if they match, reprogramming of the boot area can be performed in step S900. If they do not match, an error message may be displayed (S400).

According to the above-described embodiments, when the diagnostic device 31 and the ECU 32 are running in the boot area, in the case where the boot ROM identification information of the ECU 32 matches the reprogram ROM identification information of the diagnostic device 31 (i.e., the case where reprogramming of the ECU 32 is required, and in a situation where the ECU 32 cannot receive the BSL area entry CAN message due to problems in the network environment at the time of booting), by forcibly deleting the boot area so that the boot area is in an abnormal state at the time of booting the ECU 32, entry into the BSL area can be forced according to the abnormal state of the boot area. Accordingly, boot reprogramming can be performed by checking whether ROM identification information in the BSL area and the reprogram ROM identification information in the diagnostic device 31 match.

Figure 6:
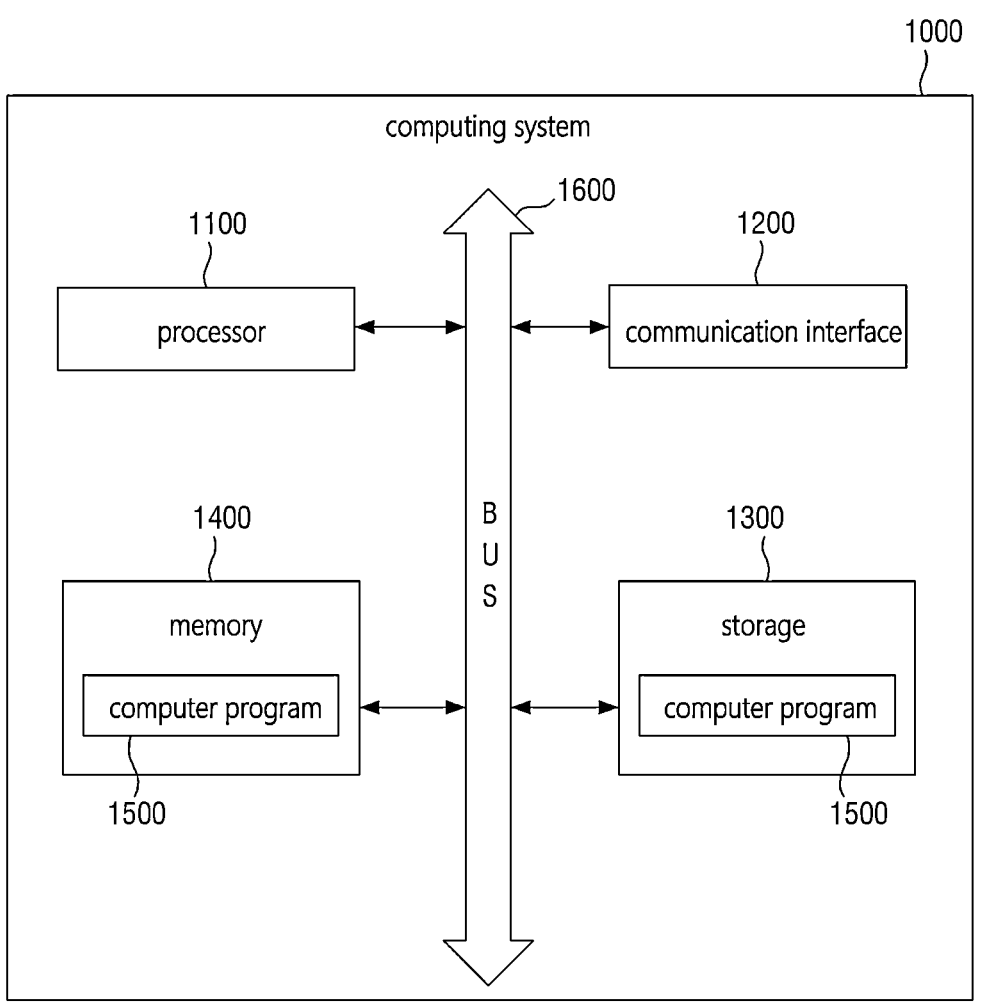
FIG. 6 is a hardware configuration diagram of a computing system according to some embodiments of the present disclosure.

FIG. 6 is a hardware configuration diagram of a computing system according to some embodiments of the present disclosure. The computing system 1000 shown in FIG. 6 may refer to, for example, a computing system including the ECU 32 described with reference to FIG. 2, or may refer to a computing system including the diagnostic device 31. The computing system 1000 may include one or more processors 1100, a system bus 1600, a communication interface 1200, a memory 1400 that loads a computer program 1500 executed by the processor 1100, and a storage 1300 that stores a computer program 1500.

According to one embodiment, the computing system 1000 may be a microcomputer implemented in the form of a single System on Chip (SoC).

The processor 1100 controls the overall operation of each component of the computing system 1000. The processor 1100 may perform operations on at least one application or program to execute methods/operations according to various embodiments of the present disclosure. Here, the processor 1100 may be, for example, a microprocessor.

The memory 1400 stores various data, commands and/or information. The memory 1400 may load one or more computer programs 1500 from the storage 1300 to execute methods/operations according to various embodiments of the present disclosure. The bus 1600 provides communication functions between components of computing device 1000. The communication interface 1200 supports Internet communication of the computing system 1000. The storage 1300 may non-temporarily store one or more computer programs 1500. The computer program 1500 may include one or more instructions implementing methods/operations according to various embodiments of the present disclosure. When the computer program 1500 is loaded into the memory 1400, the processor 1100 can perform methods/operations according to various embodiments of the present disclosure by executing the one or more instructions.

In some embodiments, the computer program 1500 may include, for example, in a method performed by an ECU, instructions for performing the steps comprising manipulating a boot area of an ECU so that the boot area is in an abnormal state, entering a boot strap loader (BSL) area of the ECU in response to detecting that the boot area is in an abnormal state upon resetting the ECU, determining whether to perform reprogramming of the boot area based on ROM identification information stored in the BSL area, and reprogramming, when it is determined to perform the reprogramming, the boot area.

So far, a variety of embodiments of the present disclosure and the effects according to embodiments thereof have been mentioned with reference to FIGS. 1-6. The effects according to the technical idea of the present disclosure are not limited to the forementioned effects, and other unmentioned effects may be clearly understood by those of ordinary skill in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those of ordinary skill in the art should appreciate that many variations and modifications can be made to the embodiments without substantially departing from the principles of the present disclosure. Therefore, the disclosed embodiments of the disclosure are used in a generic and descriptive sense only and not for purposes of limitation.

What is claimed is:

1. A method performed by an electronic control unit (ECU) using a diagnostic device to reprogram the ECU, the method comprising:

determining that reprogramming of a boot area of the ECU is required;

determining that access to a boot strap loader (BSL) area of the ECU is restricted based on determining that a BSL entry Controller Area Network (CAN) message is not received at a time of booting the ECU, the BSL area including codes for reprogramming the boot area;

in response to a determination that access to the BSL area of the ECU is restricted, manipulating the boot area by deleting the boot area so that the boot area transitions from a normal state to an abnormal state;

entering the BSL area in response to detecting that the boot area is in the abnormal state upon resetting the ECU; and reprogramming the boot area based on a read-only memory (ROM) identification information stored in the BSL area.

2. The method of claim 1, wherein manipulating the boot area comprises:

determining whether ROM identification information stored in the boot area matches ROM identification information stored in a diagnostic device;

upon determining that the ROM identification information stored in the boot area and the ROM identification information stored in the diagnostic device do not match, determining whether the ROM identification information stored in the BSL area and the ROM identification information stored in the diagnostic device do not match;

upon determining that the ROM identification information stored in the BSL area and the ROM identification information stored in the diagnostic device do not match, determining information necessary for reprogramming the boot area; and upon identifying the information necessary for the reprogramming, deleting the boot area.

3. The method of claim 2, wherein the information necessary for the reprogramming includes vehicle model and controller information.

4. The method of claim 2, wherein entering the BSL area comprises:

performing reset of the ECU; and upon confirming that the boot area is not in a normal state when booting the ECU, entering the BSL area.

5. The method of claim 1, wherein the ROM identification information stored in the BSL area includes vehicle model, controller, and software version.

6. The method of claim 1, wherein entering the BSL area comprises:

upon confirming that the boot area is not in a normal state when booting the ECU, entering the BSL area.

7. The method of claim 1, further comprising:

before manipulating the boot area, running the ECU in the boot area.

8. An electronic control unit (ECU) comprising:

at least one processor;

a memory for loading a boot program executed by the at least one processor; and a storage for storing the boot program, wherein the boot program includes instructions for performing operations for reprogramming the ECU using a diagnostic device, and wherein the operations comprise:

determining that reprogramming of a boot area of the ECU is required;

determining that access to a boot strap loader (BSL) area of the ECU is restricted based on determining that a BSL entry Controller Area Network (CAN) message is not received at a time of booting the ECU, the BSL area including codes for reprogramming the boot area;

in response to a determination that access to the BSL area of the ECU is restricted, manipulating the boot area by deleting the boot area so that the boot area transitions from a normal state to an abnormal state;

entering the BSL area in response to detecting that the boot area is in the abnormal state upon resetting the ECU; and reprogramming of the boot area based on a read-only memory (ROM) identification information stored in the BSL area.

9. The ECU of claim 8, wherein manipulating the boot area of the ECU comprises:

determining whether ROM identification information stored in the boot area matches ROM identification information stored in a diagnostic device;

when it is confirmed that the ROM identification information stored in the boot area and the ROM identification information stored in the diagnostic device do not match, determining whether the ROM identification information stored in the BSL area and the ROM identification information stored in the diagnostic device do not match;

when the ROM identification information stored in the BSL area and the ROM identification information stored in the diagnostic device do not match, determining information necessary for reprogramming the boot area; and when information necessary for the reprogramming is identified, deleting the boot area.

10. The ECU of claim 9, wherein the information necessary for the reprogramming includes vehicle model and controller information.

11. The ECU of claim 9, wherein entering the BSL area comprises:

performing reset of the ECU; and upon confirming that the boot area is not in a normal state when booting the ECU, entering the BSL area.

12. The ECU of claim 8, wherein the ROM identification information stored in the BSL area includes vehicle model, controller, and software version.

13. The ECU of claim 8, wherein entering the BSL area comprises:

upon confirming that the boot area is not in a normal state when booting the ECU, entering the BSL area.

14. The ECU of claim 8, wherein the operations performed by the boot program further comprises:

before manipulating the boot area, running the ECU in the boot area.

* * * * *